(12) United States Patent
Wang et al.

(10) Patent No.: US 12,517,101 B2
(45) Date of Patent: Jan. 6, 2026

(54) FLUID QUALITY TRACING METHOD AND SYSTEM

(71) Applicant: INDUSTRIAL TECHNOLOGY RESEARCH INSTITUTE, Hsinchu (TW)

(72) Inventors: Yu-Lin Wang, Tainan (TW); Guang-Huei Gu, Tainan (TW); Chih-Jen Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 582 days.

(21) Appl. No.: 17/945,901

(22) Filed: Sep. 15, 2022

(65) Prior Publication Data

US 2023/0184732 A1    Jun. 15, 2023

(30) Foreign Application Priority Data

Dec. 10, 2021 (TW) ................................. 110146357

(51) Int. Cl.
   *G01N 33/00*  (2006.01)
   *G06F 16/29*  (2019.01)
(52) U.S. Cl.
   CPC ..... *G01N 33/0075* (2013.01); *G01N 33/0063* (2013.01); *G01N 33/0067* (2013.01); *G06F 16/29* (2019.01)
(58) Field of Classification Search
   None
   See application file for complete search history.

(56) References Cited

U.S. PATENT DOCUMENTS

| 9,959,374 B2 | 5/2018 | Rosti et al. |
| 10,648,805 B2 | 5/2020 | Bai et al. |

(Continued)

FOREIGN PATENT DOCUMENTS

| CN | 105181898 B | 12/2015 |
| CN | 112131739 A | 12/2020 |

(Continued)

OTHER PUBLICATIONS

TW Office Action dated Dec. 5, 2022 as received in Application No. 110146357.

(Continued)

*Primary Examiner* — Daniel S Larkin
(74) *Attorney, Agent, or Firm* — Maschoff Brennan

(57) ABSTRACT

A fluid quality tracing method includes obtaining pieces of fluid concentration distribution data of a detected region corresponding to detection time points respectively, generating pieces of concentration grid data respectively according to the pieces of fluid concentration distribution data, obtaining pieces of fluid moving data of the detected region corresponding to the detection time points respectively, obtaining estimated positions according to the fluid moving data and an initial position, and creating a fluid concentration trajectory according to the pieces of concentration grid data, the initial position and the estimated positions. The initial position and the estimated positions are located in the detected region. The fluid concentration trajectory includes line segments with terminals corresponding to the initial position and the estimated positions respectively, and the line segments indicate concentration representative values respectively.

18 Claims, 8 Drawing Sheets

(56) References Cited

U.S. PATENT DOCUMENTS

| 10,690,562 | B2 | 6/2020 | Rieker et al. |
| 10,775,258 | B2 | 9/2020 | Muralidhar et al. |
| 10,890,350 | B2 | 1/2021 | Martin |
| 2018/0313649 | A1 | 11/2018 | Bai et al. |
| 2020/0252283 | A1 | 8/2020 | Su et al. |
| 2020/0393434 | A1 | 12/2020 | Li et al. |

FOREIGN PATENT DOCUMENTS

| TW | I498553 B | 9/2015 |
| TW | I640963 | 11/2018 |
| TW | I646321 B | 1/2019 |
| TW | I698760 | 7/2020 |
| TW | M598942 | 7/2020 |
| TW | M605632 | 12/2020 |
| TW | I720324 | 3/2021 |

OTHER PUBLICATIONS

Punsompong et al., "Identification of potential sources of PM10 pollution from biomass burning in northern Thailand using statistical analysis of trajectories" Nov. 2018.

Lou et al., "Potential Sources and Transport Pathways of PM2.5 in Shanghai, China." Jul. 2015.

Lin et al. "Using trajectory model and weather patterns to investigate PM2.5 potential source areas of Taichung City" Retrieved Sep. 12, 2022.

Yan et al., "A heavy haze episode in Beijing in February of 2014: Characteristics, origins and implications" 2015.

FLUID QUALITY TRACING METHOD AND SYSTEM

CROSS-REFERENCE TO RELATED APPLICATIONS

This non-provisional application claims priority under 35 U.S.C. § 119(a) on Patent Application No(s). 110146357 filed in Republic of China (ROC) on Dec. 10, 2021, the entire contents of which are hereby incorporated by reference.

BACKGROUND

1. Technical Field

This disclosure relates to a fluid quality tracing method.

2. Related Art

Air pollutions are main causes of climate change, so monitoring air quality would be the first stage in reducing air pollution. The conventional air quality display method is marking sensor areas with abnormal concentration values on the map image. The occurrence time and potential source of pollution are mostly estimated by monitoring personnel by playing back and forth images of concentration distribution in the form of videos, so the accuracy would depend on judgment and experience of individual.

SUMMARY

According to one or more embodiment of this disclosure, performed by a fluid quality tracing method includes: obtaining a number of pieces of fluid concentration distribution data of a detected region, wherein the pieces of fluid concentration distribution data corresponds to a number of detection time points respectively; generating a number of pieces of concentration grid data respectively according to the pieces of fluid concentration distribution data; obtaining a number of pieces of fluid moving data of the detected region, wherein the pieces of fluid moving data corresponds to the detection time points respectively; obtaining a number of estimated positions according to the pieces of fluid moving data, an initial position and an initial time point corresponding to the initial position, wherein the initial position and the estimated positions are located in the detected region; and creating a fluid concentration trajectory according to the pieces of concentration grid data, the initial position, the initial time point and the estimated positions, wherein the fluid concentration trajectory includes a number of line segments, a number of terminals of the line segments corresponds to the initial position and the estimated positions respectively, and the line segments indicate a number of concentration representative values respectively.

According to one or more embodiment of this disclosure, a fluid quality tracing system includes: a data input device, a processing device and a storage device, wherein the processing device is connected to the data input device and the storage device. The data input device is configured to obtain a number of pieces of fluid concentration distribution data and a number of pieces of fluid moving data of a detected region, wherein the pieces of fluid concentration distribution data correspond to a number of detection time points respectively, and the pieces of fluid moving data correspond to the detection time points respectively. The processing device is configured to perform: generating a number of pieces of concentration grid data respectively according to the pieces of fluid concentration distribution data; obtaining a number of estimated positions according to the pieces of fluid moving data and an initial position, wherein the initial position and the estimated positions are located in the detected region; and creating a fluid concentration trajectory according to the pieces of concentration grid data, the initial position and the estimated positions, wherein the fluid concentration trajectory includes a number of line segments, a number of terminals of the line segments correspond to the initial position and the estimated positions respectively, and the line segments indicate a number of concentration representative values respectively. The storage device is configured to store the fluid concentration trajectory.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
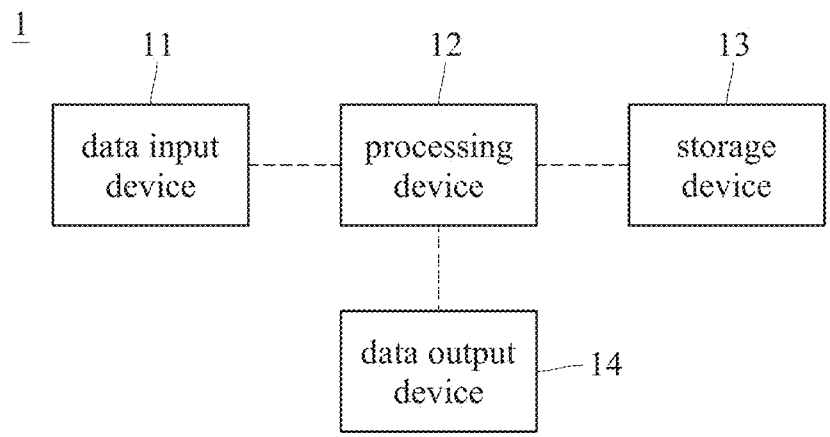
FIG. 1 is a functional block diagram illustrating a fluid quality tracing system according to an embodiment of the present disclosure.

Please refer to FIG. 1, wherein FIG. 1 is a functional block diagram illustrating a fluid quality tracing system 1 according to an embodiment of the present disclosure. The fluid quality tracing system 1 may perform quality tracing on gas or liquid inside a specific detected region. For example, the fluid quality tracing system 1 may track the air quality of a specific industrial area, the air quality of a specific city, the river water quality of a specific river, and the sea water quality of a specific sea area. As shown in FIG. 1, the fluid quality tracing system 1 includes a data input device 11, a processing device 12, a storage device 13 and a data output device 14, wherein the processing device 12 is connected to the data input device 11, the storage device 13 and the data output device 14 in a wired way or in a wireless way.

The data input device 11 may include a wireless communication module using a communication technology such as Wi-Fi, 4G, 5G, etc. The data input device 11 may be connected to one or more external storage mediums to obtain the data required for performing fluid quality tracing on a detected region. Said one or more external storage mediums may store data from different sources including, but not limited to, satellite data, observation station data, IoT sensor data. Said data includes a number of pieces of fluid concentration distribution data and a number of pieces of fluid moving data of the detected region detected at a number of detection time points respectively. Each of the detection time points corresponds to a piece of fluid concentration distribution data and a piece of fluid moving data. The contents included in the fluid concentration distribution data and the fluid moving data are described below.

The processing device 12 may include, but not limited to, a single processor and an integration of a number of microprocessors, such as a central processing unit (CPU), graphic processing unit (GPU), etc. The processing device 12 is configured to perform fluid quality tracing according to the data of the detected region obtained by the data input device 11, wherein the steps performed by the processing device 12 are described below. The storage device 13 may include, but not limited to, a flash memory, a hard disk memory (HDD), a solid disk memory (SSD), a dynamic random access memory (DRAM) or a static random access memory (SRAM). The storage device 13 may store the result of the fluid quality tracing generated by the processing device 12. The data output device 14 is optionally disposed. The data output device 14 may be a display for displaying the result of the fluid quality tracing for the user to look. Alternatively, the data output device 14 may be a wired or wireless data transmission port for outputting the result of the fluid quality tracing to an external device for other application.

Figure 2:
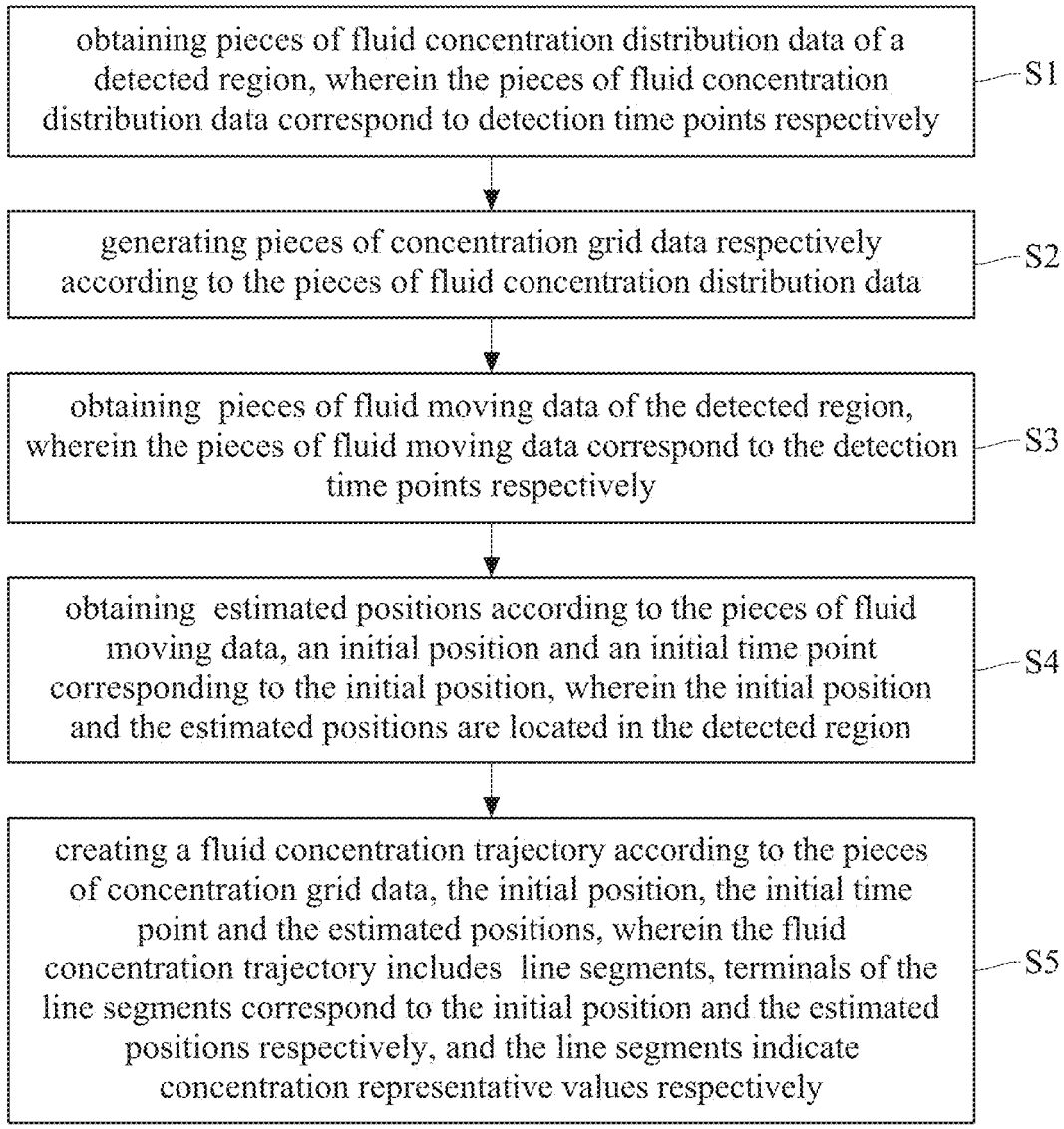
FIG. 2 is a flowchart illustrating a fluid quality tracing method according to an embodiment of the present disclosure.
Figure 3:
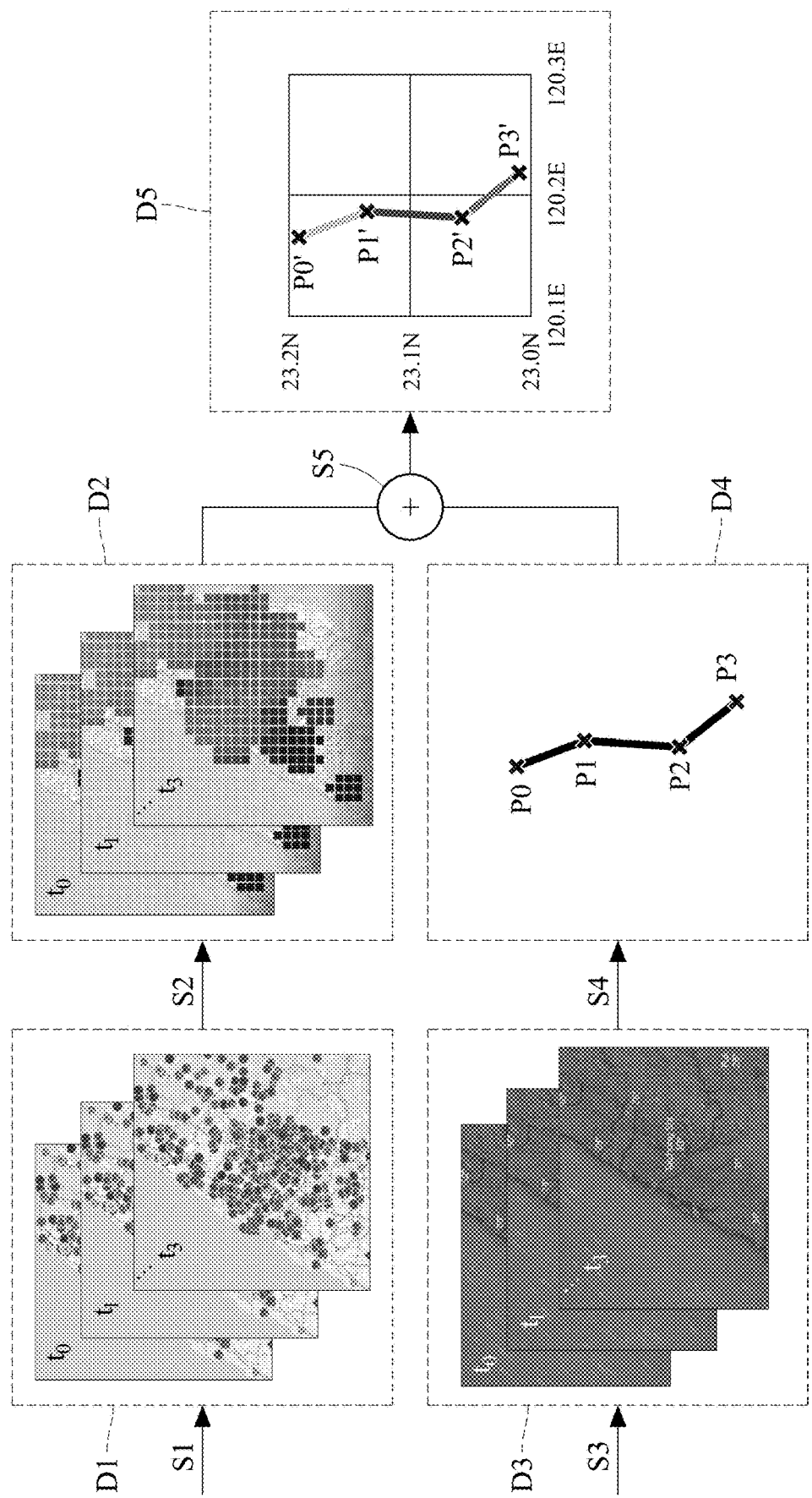
FIG. 3 is an execution diagram illustrating a fluid quality tracing method according to an embodiment of the present disclosure.

Please refer to FIG. 2 and FIG. 3, wherein FIG. 2 and FIG. 3 are respectively a flowchart and an execution diagram illustrating a fluid quality tracing method according to an embodiment of the present disclosure. The fluid quality tracing method shown in FIG. 2 and FIG. 3 may be applied to the fluid quality tracing system 1 shown in FIG. 1, particularly performed by the processing device 12, but is not limited thereto.

As shown in FIG. 2 and FIG. 3, the fluid quality tracing method may include performing, by the processing device: step S1, obtaining pieces of fluid concentration distribution data D1 of the detected region, wherein the pieces of fluid concentration distribution data D1 correspond to detection time points t0-t3 respectively; step S2, generating pieces of concentration grid data D2 respectively according to the pieces of fluid concentration distribution data D1; step S3, obtaining pieces of fluid moving data D3 of the detected region, wherein the pieces of fluid moving data D3 correspond to the detection time points t0-t3 respectively; step S4, obtaining estimated positions P1-P3 according to the pieces of fluid moving data D3, an initial position P0 and an initial time point corresponding to the initial position P0, wherein the initial position P0 and the estimated positions P1-P3 are located in the detected region; and step S5, creating a fluid concentration trajectory D5 according to the pieces of concentration grid data D2, the initial position P0, the initial time point and the estimated positions P1-P3, wherein the fluid concentration trajectory D5 includes line segments, terminals P0'-P3' of the line segments correspond to the initial position P0 and the estimated positions P1-P3 respectively, and the line segments indicate concentration representative values respectively.

Particularly, said initial position P0 and said estimated positions P1-P3 may compose trajectory data D4. FIG. 3 exemplarily illustrates the trajectory data D4 including connecting lines between the initial position P0 and said estimated positions P1-P3, but the trajectory data in another embodiment may merely include the initial position and the estimated positions. The detection time points t0-t3 may by separated by the same time interval, that is, any two adjacent detection time points of the detection time points may have the same time interval therebetween. Said time interval may depend on the frequency of the data source updating the data, or may depend on the scale of the detected region, or may be set by the user based on other requirements, which is not limited in the present disclosure. The number of the detection time points t0-t3 and the number of the estimated positions P1-P3 shown in FIG. 3 are merely examples, and the present disclosure is not limited thereto. It should be noted that steps S3-S4 may be performed before steps S1-S2, or may performed simultaneously with steps S1-S2, which is not limited in the present disclosure. The following further describes steps S1-S5.

In step S1, the fluid concentration distribution data D1 may be satellite data, observation station data, IoT sensor data or other public data. The fluid concentration distribution data D1 may include a number of concentration point positions and a number of concentration point values correspond to said concentration point positions respectively. More particularly, each of the concentration point positions indicates the geographic position of an observation station located in the detected region, the concentration point values indicate the concentration value detected at the corresponding observation station. In an implementation, the fluid concentration distribution data D1 may be a map image presenting fluid concentration distribution. More particularly, the fluid concentration distribution data D1 may include a map of the detected region, and the concentration point values may be marked at the positions on the map corresponding to the concentration point positions, for example, marked by dots with different colors or by other patterns, or marked by numerical values. For example, the fluid concentration distribution data D1 is the concentration distribution data of specific particles in the air, the concentration distribution data of specific chemical substances in the ocean, etc.

In step S2, the processing device may process each of the pieces of the fluid concentration distribution data D1 to generate concentration grid data. Step S2 may include performing steps on each of the pieces of the fluid concentration distribution data D1, wherein the steps include: dividing the detected region into a number of grids; and according to a region of each of the grids and the concentration point positions in the fluid concentration distribution data, obtaining one or more concentration point values of the fluid concentration distribution data values indicated by one or more concentration point positions in each of the grids, and performing calculation on the one or more concentration point values to obtain a grid concentration value of each of the grids. In an implementation of the fluid concentration distribution data D1 presented as a map image, the above steps may be implemented by dividing the map image with a number of grids, and obtaining one or more concentration point values indicated by one or more concentration points in each of the grids for performing calculation to obtain the grid concentration value of each of the grids.

Figure 4:
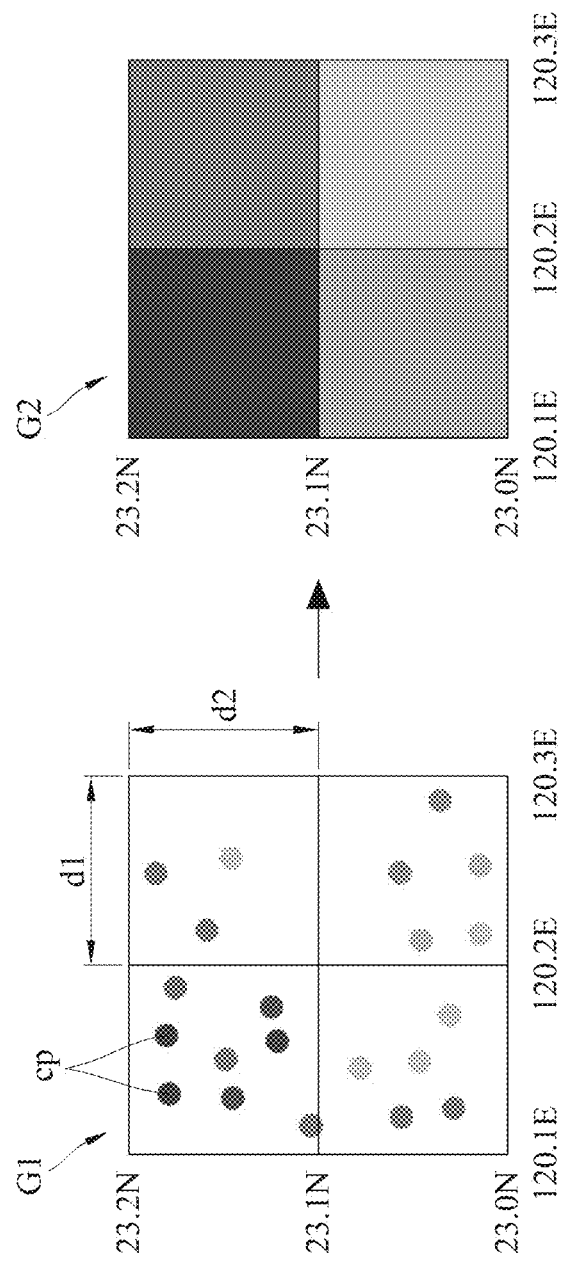
FIG. 4 is an execution diagram illustrating generating concentration grid data in a fluid quality tracing method according to an embodiment of the present disclosure.

Please refer to FIG. 4. FIG. 4 is an execution diagram illustrating generating concentration grid data in a fluid quality tracing method according to an embodiment of the present disclosure. As shown in FIG. 4, each of the grids generated by dividing the detected region includes one or more concentration point positions cp in the fluid concentration distribution data G1, and each of the concentration point positions cp indicates one concentration point value, for example, indicted by color. The unit area (grid lenq$^{th}$ d1×grid lenq$^{th}$ d2, referred to as "d1×d2" hereinafter) of the grid may depend on the scale of the detected region. For example, if the detected region is an industrial area, the unit area of the grid d1×d2 may be set as 100 meters×100 meters; if the detected region is an metropolitan area, the unit area of the grid d1×d2 may be set as 1 kilometer×1 kilometer; if the detected region is the entire Taiwan, the unit area of the grid d1×d2 may be set as 10 kilometers×10 kilometers.

The processing device may calculate the average of the concentration values of the concentration point positions cp contained in each grid, and use the average as the grid concentration value. The concentration grid data G2 may include a corresponding relationship between the region of each grid (for example, the indicated geographic area) and the grid concentration value. In an implementation, the processing device may fill the grid with a color indicated by the grid concentration value as the concentration grid data G2. Said calculation of the grid concentration value may be presented as equation (1):

$$gc = \frac{\sum_i p_i}{|P|} \quad (1)$$

wherein gc represents the grid concentration value, P represents the number of the concentration point positions cp in the grid, pi represents the concentration point value of i$^{th}$ concentration point position cp. It should be noted that FIG. 4 exemplarily illustrates the concentration point positions cp and the grids presenting different concentration values with different colors, but the concentration values may be presented as numerical values or other forms, which is not limited in the present disclosure. In addition, FIG. 4 exemplarily presents a part of fluid concentration distribution data G1 and concentration grid data G2 with four grids, but the number and size of the grids are not limited by those shown in FIG. 4.

Please refer to FIG. 2 and FIG. 3 again. In step S3, the fluid moving data D3 may include a number of pieces of source sub-data from different data sources. Said data sources may include, but not limited to, satellite database, observation station database and IoT sensor database. Each of the pieces of source sub-data includes fluid velocity information and fluid direction information. For air quality tracing, the fluid moving data D3 may be wind field data including wind velocity information and wind direction information. For fluid quality tracing, the fluid moving data D3 may be ocean current data including ocean current velocity information and ocean current direction information. FIG. 3 exemplarily illustrates the fluid moving data D3 as an image including the fluid velocity information and the fluid direction information, but the fluid moving data D3 may be a table or other forms of data recording the respective fluid velocity values and fluid direction angles of the detected region at the detection time points t0-t3.

Figure 5:
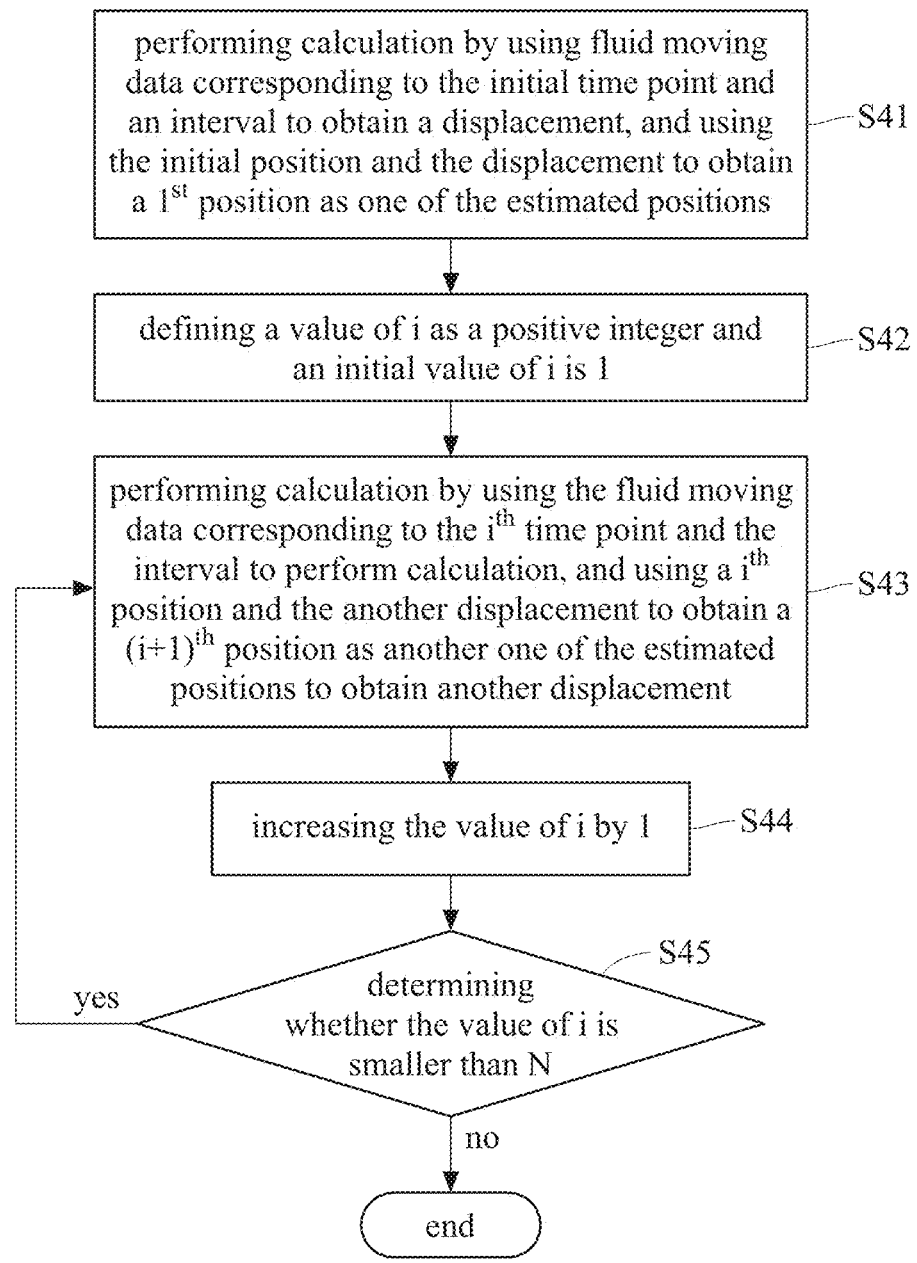
FIG. 5 is a flowchart illustrating generating estimated positions in a fluid quality tracing method according to an embodiment of the present disclosure.

In step S4, the initial position P0 may correspond to an initial time point, wherein the initial time point corresponds to one of the detection time points t0-t3. The number of the estimated positions P1-P3 is N. The value of N shown in FIG. 3 is 3, but N may be other positive integer, and may be set by the user based on requirement. Please refer to FIG. 5. FIG. 5 is a flowchart illustrating generating estimated positions in a fluid quality tracing method according to an embodiment of the present disclosure. As shown in FIG. 5, step S4 of FIG. 2 may include: step S41, performing calculation by using fluid moving data corresponding to the initial time point and a time interval to obtain a displacement, and using the initial position and the displacement to obtain a 1$^{st}$ position as one of the estimated positions; step S42, defining a value of i as a positive integer and an initial value of i is 1; step S43, performing calculation by using the fluid moving data corresponding to a i$^{th}$ time point $t_i$ and the time interval to perform calculation, and using a i$^{th}$ position and the another displacement to obtain a (i+1)$^{th}$ position as another one of the estimated positions to obtain another displacement; step S44, increasing the value of i by 1; step S45, determining whether the value of i is smaller than N; when the determination result of step S45 is "no", ending the process; when the determination result of step S45 is "yes", performing step S43 again. Steps S43-S45 compose a loop calculation, and this loop calculation is performed repeatedly until the value of i is N.

The generation of the estimated positions described above may be implemented by repeatedly performing the calculation of equation (2) and equation (3), wherein equation (2) and equation (3) are shown as below:

$$X(t_m) = X(t_{m-1}) + \Delta x_{t_{m-1}} \quad (2)$$

$$Y(t_m) = Y(t_{m-1}) + \Delta y_{t_{m-1}} \quad (3)$$

wherein m is a positive integer, $X(t_m)$ and $Y(t_m)$ respectively represent x-coordinate and y-coordinate of the position corresponding to the detection time point $t_m$, $t_m$ represents m$^{th}$ time point and $t_m = t_{m-1} + \Delta t$, $\Delta t$ represents the time interval, $\Delta x_{t_{m-1}}$ and $\Delta y_{t_{m-1}}$ respectively represent the displacements on x-axis and y-axis from the estimated position corresponding to the detection time point $t_{m-1}$ to the estimated position corresponding to the detection time point $t_m$.

In an implementation, the processing device obtains the estimated position in a chronological order, meaning under the condition that $\Delta t$ in $t_m = t_{m-1} + \Delta t$ is a positive value. In this implementation, the initial time point may also be set as one of the detection time points described above, the 1$^{st}$ time point $t_1$ is a detection time point later than the initial time point, the 2nd time point $t_2$ may be set as a detection time point later than the 1$^{st}$ time point $t_1$, and so on. The initial position and the initial time point in step S41 may be set by a user based on requirements, and step S41 may be implemented by substituting the coordinates of the initial position into $X(t_{m-1})$ and $Y(t_{m-1})$ of equations (2) and (3) and using the obtained $X(t_m)$ and $Y(t_m)$ as the coordinates of the P$^t$ position, meaning obtaining $X(t_1)$ and $Y(t_1)$. Step S43 uses the fluid moving data corresponding to the i$^{th}$ time point to obtain the displacement $\Delta x_{t_i}$ and $\Delta y_{t_i}$, and step S43 may substitute the coordinates $X(t_i)$ and $Y(t_i)$ of the $i^{th}$ position into $X(t_{m-1})$ and $Y(t_{m-1})$ of equations (2) and (3), and calculate $X(t_m)$ and $Y(t_m)$ of equations (2) and (3) to obtain the coordinates $X(t_{i+1})$ and $Y(t_{i+1})$ of the $(i+1)^{th}$ position.

In another implementation, the processing device obtains the estimated position in reverse chronological order, meaning under the condition that $\Delta t$ in $t_m=t_{m-1}+\Delta t$ is a negative value. In this implementation, the initial time point $t_0$ may be set as one of the detection time points $t_0$-$t_3$ described above, the $1^{st}$ time point $t_1$ is a detection time point earlier than the initial time point to, the 2nd time point $t_2$ is a detection time point earlier than the $1^{st}$ time point $t_1$, and so on. The initial position in step S41 may be the detection position where a pollution alarm occurs, the initial time point may be the detection time point (the pollution alarm time point) when the pollution alarm occurs. For example, the time point when a pollution alarm occurs is the detection time point $t_0$ shown in FIG. 3, the initial time point is set as the detection time point $t_0$ shown in FIG. 3. Step S41 may be implemented by substituting the coordinates $X(t_0)$ and $Y(t_0)$ of the initial position into $X(t_{m-1})$ and $Y(t_{m-1})$ of equations (2) and (3) and calculating $X(t_m)$ and $Y(t_m)$ to obtain the coordinates $X(t_1)$ and $Y(t_1)$ as the coordinates of the $1^{st}$ position. Step S43 uses the fluid moving data corresponding to the $i^{th}$ time point $t_0$ obtain the displacement $\Delta x_{t_i}$ and $\Delta y_{t_i}$, for example, using i=1 to obtain $\Delta x_{t_i}$ and $\Delta y_{t_i}$, and step S43 may obtain the coordinates $X(t_{i+1})$ and $Y(t_{i+1})$ of the (i+1) position, for example, obtaining $X(t_2)$ and $Y(t_2)$, by substituting the coordinates $X(t_i)$ and $Y(t_i)$ of the $i^{th}$ position into $X(t_{m-1})$ and $Y(t_{m-1})$ of equations (2) and (3) and calculating $X(t_m)$ and $Y(t_m)$ of equations (2) and (3).

The following further describes the method of obtaining the displacement, which may include: determining a number of weights corresponding to the pieces of source sub-data respectively according to the scale of the detected region; using the pieces of source sub-data to obtain a number of displacement components; performing a weighted sum operation on the displacement components by using the weights; and multiplying a result of the weighted sum operation by the time interval to obtain a product as the displacement. As described above, the fluid moving data may include the pieces of source sub-data originated from different data sources, such as satellite sub-data, observation station sub-data and IoT sensor sub-data.

Figure 6:
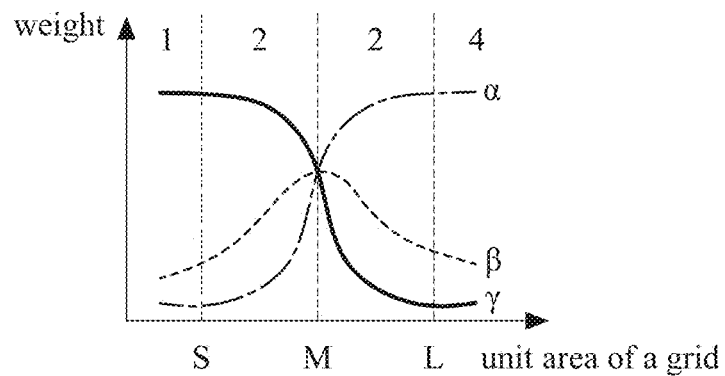
FIG. 6 is a schematic diagram illustrating weight relationship used by a fluid quality tracing method according to an embodiment of the present disclosure.

For the relationships of the weights of the three types of sub-data and the scale of the detected region, please refer to FIG. 6. FIG. 6 is a schematic diagram illustrating weight relationship used by a fluid quality tracing method according to an embodiment of the present disclosure. In FIG. 6, the weights of the satellite sub-data, the observation station sub-data and the IoT sensor sub-data are $\alpha$, $\beta$ and $\gamma$ respectively. The relationships between the three weights $\alpha$, $\beta$ and $\gamma$ may be in accordance with the unit area of the grid for generating the concentration grid data as described above. As described above, the unit area of the grid may depend on the scale of the detected region. The unit area of the grid may be divided with three scale thresholds S, M and L. For example, the scale threshold S may be set as 100 meters×100 meters, the scale threshold M may be set as 1 kilometer×1 kilometer, and the scale threshold L may be set as 5 kilometers×5 kilometers.

As shown in FIG. 6, if the unit area of the grid X is smaller than the scale threshold S, the relationships between the weights $\alpha$, $\beta$ and $\gamma$ are a being far smaller than $\beta$ and $\beta$ being smaller than $\gamma$; if the unit area of the grid X is between the scale thresholds S and M, the relationships between the weights $\alpha$, $\beta$ and $\gamma$ are a being smaller than $\beta$ and $\alpha$ being smaller than $\gamma$; if the unit area of the grid X is between the scale thresholds M and L, the relationships between the weights $\alpha$, $\beta$ and $\gamma$ are a being greater than $\gamma$ and $\beta$ being greater than $\gamma$; if the unit area of the grid X is greater than or equals to the scale threshold L, the relationships between the weights $\alpha$, $\beta$ and $\gamma$ are a being far greater than $\beta$ and $\beta$ being greater than $\gamma$. In the above various relationships, the sum of the weights $\alpha$, $\beta$ and $\gamma$ is 1, the actual values of the weights $\alpha$, $\beta$ and $\gamma$ may be set by a user according to the above relationships and requirements, the present disclosure is not limited thereto.

After determining the weights of the source sub-data, the processing device may use the determined weights and the displacement components calculated using different pieces of source sub-data to perform the weighted sum operation. Said displacement components may be calculated using the fluid velocity information and the fluid direction information in the source sub-data. The processing device then multiplies the result of the weighted sum operation with the time interval to obtain product as the displacement. Said obtaining of the displacement may be presented as equation (4) and equation (5):

$$\Delta x_i = \begin{bmatrix} \alpha \\ \beta \\ \gamma \end{bmatrix} * [ws_k * \cos\theta_k \quad ws_l * \cos\theta_l \quad ws_m * \cos\theta_m] * \Delta t \quad (4)$$

$$\Delta y_i = \begin{bmatrix} \alpha \\ \beta \\ \gamma \end{bmatrix} * [ws_k * \cos\theta_k \quad ws_l * \cos\theta_l \quad ws_m * \cos\theta_m] * \Delta t \quad (5)$$

wherein $ws_k$ and $\theta_k$ respectively represent the fluid velocity value and the fluid direction angle corresponding to time point $(t+\Delta t)$ included in the satellite sub-data, $ws_l$ and $\theta_l$ respectively represent the fluid velocity value and the fluid direction angle corresponding to time point $(t+\Delta t)$ included in the observation station sub-data, $ws_m$ and $\theta_m$ respectively represent the fluid velocity value and the fluid direction angle corresponding to time point $(t+\Delta t)$ included in the IoT sensor sub-data. It is worth noting that under the condition of $\Delta t$ being a negative value, when using the fluid velocity value ws and the fluid direction angle $\theta$ to obtain the position of next detection time point, a revers fluid direction angle $\theta$ is adopted, meaning $\theta+180°$.

The above-mentioned equations of generating the estimated positions according to the various types of source sub-data may compose a trajectory construction mixed model. Comparing to merely considering the fluid moving data from a single source, the fluid quality tracing method and system using this trajectory construction mixed model may generate the trajectory data with higher accuracy.

Figure 7:
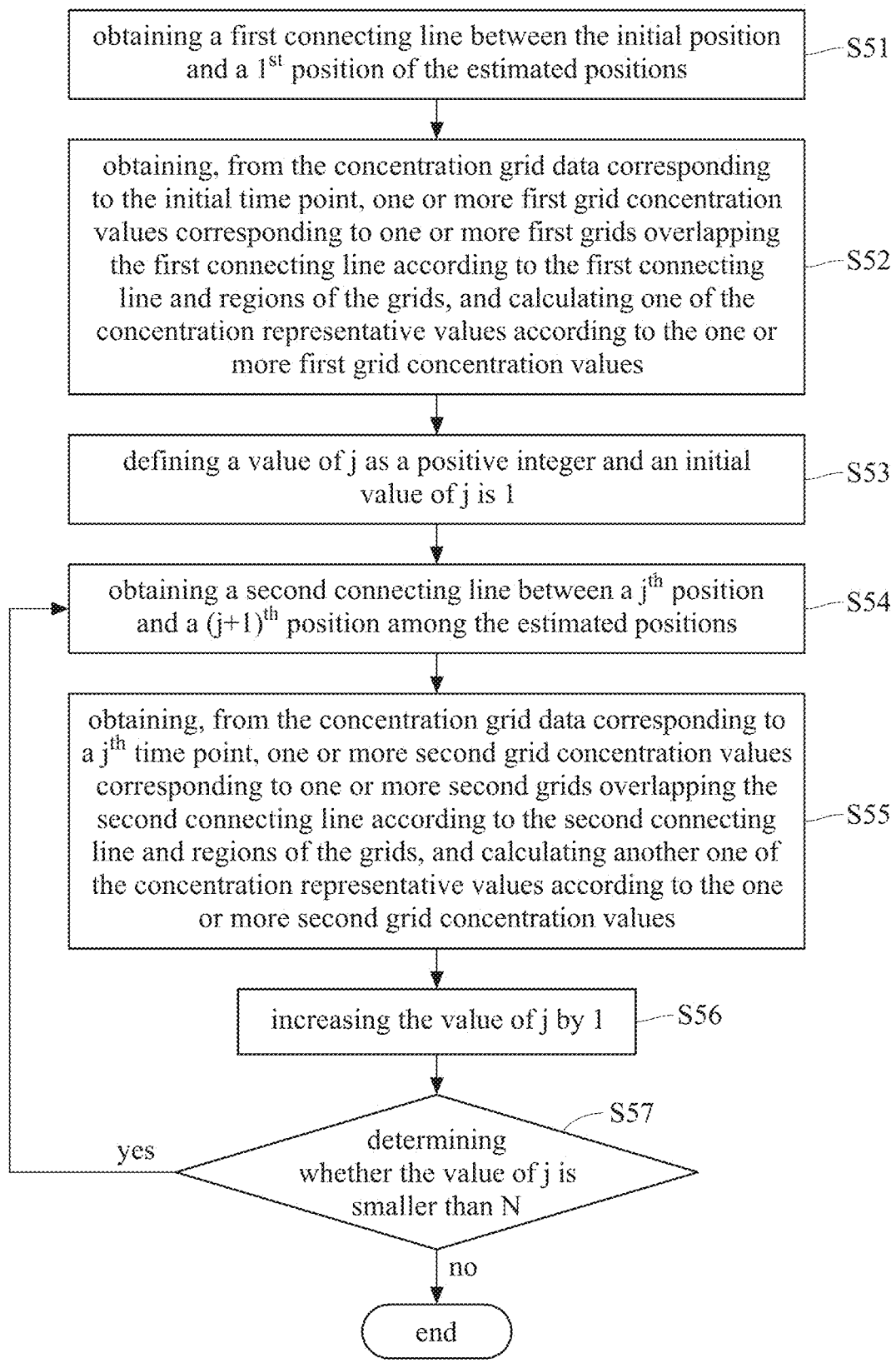
FIG. 7 is a flowchart illustrating creating a fluid concentration trajectory in a fluid quality tracing method according to an embodiment of the present disclosure.

Please then refer to FIG. 7 for the further description of step S5 of FIG. 2, wherein FIG. 7 is a flowchart illustrating creating a fluid concentration trajectory in a fluid quality tracing method according to an embodiment of the present disclosure. As shown in FIG. 5, step S5 of FIG. 2 may include: step S51, obtaining a first connecting line between the initial position and a $1^{st}$ position of the estimated positions; step S52, obtaining, from the concentration grid data corresponding to the initial time point, one or more first grid concentration values corresponding to one or more first grids overlapping the first connecting line according to the first connecting line and regions of the grids, and calculating one of the concentration representative values according to the one or more first grid concentration values; step S53, defining a value of j as a positive integer and an initial value of j is 1; step S54, obtaining a second connecting line between a $j^{th}$ position and a $(j+1)^{th}$ position of the estimated positions; step S55, obtaining, from the concentration grid data corresponding to a $j^{th}$ time point, one or more second grid concentration values corresponding to one or more second grids overlapping the second connecting line according to the second connecting line and regions of the grids, and calculating another one of the concentration representative values according to the one or more second grid concentration values; step S56, increasing the value of j by 1; step S57, determining whether the value of j is smaller than N; when the determination result of step S57 is "no", ending the process; when step S57 the determination result of step S57 is "yes", performing step S54 again. Steps S54-S57 compose a loop calculation, and this loop calculation is performed repeatedly until the value of j is N.

More particularly, when there are multiple first grids overlapping the first connecting line in step S52, step S52 may include: obtaining a number of lengths of the first connecting line overlapping the first grids respectively; and using a number of ratios of the lengths as weights of the first grid concentration values to perform a weighted sum operation, and using a result of the weighted sum operation as a concentration representative value. In addition, when there are multiple second grids overlapping the second connecting line in step S55, step S55 may also obtain the concentration representative value with the same method described above. The method of calculating the concentration representative value and the weights described above may be presented by equations (6) and (7) respectively:

$$tc = \sum w_n g c_n \quad (6)$$

$$w_n = \frac{td \in \text{grid}_n}{td} \quad (7)$$

wherein tc represents the concentration representative value of the line segment of the fluid concentration trajectory, $g_{cn}$ represents the grid concentration value of the $n^{th}$ grid overlapped by the connecting line, $w_n$ represents the weight corresponding to the grid concentration value of the $n^{th}$ grid, td represents the entire $\text{lenq}^{th}$ of the connecting lines td∈ $\text{grid}_n$ represents, the $\text{lenq}^{th}$ of the $n^{th}$ grid overlapped by the connecting line.

Figure 8:
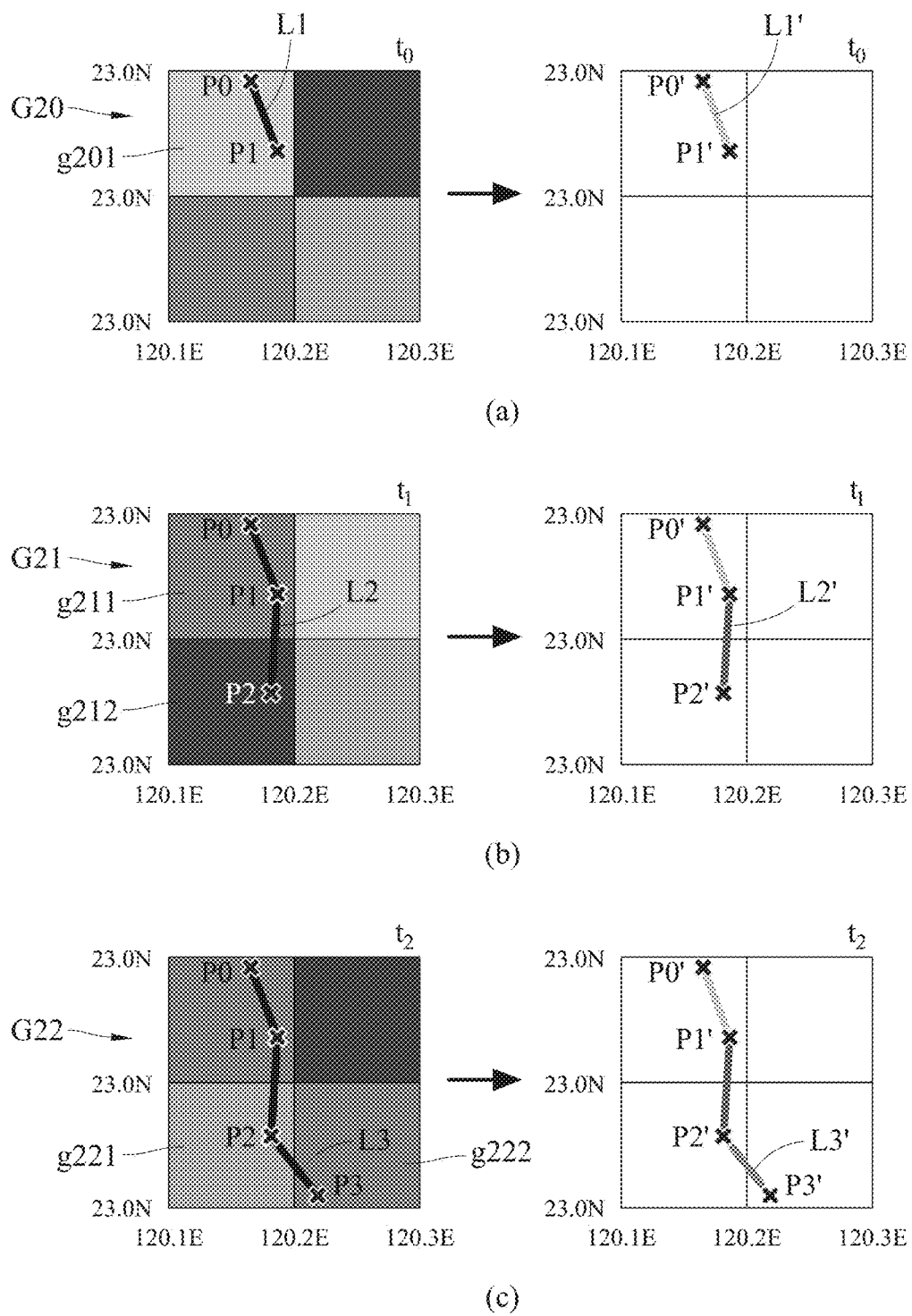
FIG. 8 is an execution diagram illustrating creating a fluid concentration trajectory in a fluid quality tracing method according to an embodiment of the present disclosure.

For describing the above-mentioned method of obtaining the concentration representative value with a schematic diagram. Please refer to FIG. 7 and FIG. 8, wherein FIG. 8 is an execution diagram illustrating creating a fluid concentration trajectory in a fluid quality tracing method according to an embodiment of the present disclosure. Sub-figure (a) of FIG. 8 corresponds to steps S51 and S52, sub-figures (b) and (c) correspond to two cycles of the loop calculation (steps S54-S57). It should be noted that FIG. 8 exemplarily illustrates different concentration values with different colors, but the concentration values may be presented as numerical values or other forms, which is not limited in the present disclosure.

As shown in sub-figure (a), the processing device obtains a connecting line L1 between the initial position P0 and the estimated position P1 (the $1^{st}$ position), obtains a grid concentration value of a grid g201 overlapping the connecting line L1 from the concentration grid data G20 corresponding to the detection time point $t_0$ (the initial time point) to calculate the concentration representative value corresponding to the connecting line L1. More particularly, the connecting line L1 is completely located in the region of the grid g201 of a concentration grid diagram G20, and thus the processing device may use the color of the grid g201 as the color of a line segment L1', meaning regarding the grid concentration value of the grid g201 as the concentration representative value of the line segment L1'.

As shown in sub-figure (b), the processing device obtains the connecting line L2 between the estimated position P1 (the $1^{st}$ position) and the estimated position P2, and obtains the grid concentration values corresponding to the grids g211 and g212 overlapping the connecting line L2 from the concentration grid data G21 corresponding to the detection time point $t_1$ (the $1^{st}$ time point) to calculate the concentration representative value corresponding to the connecting line L2. More particularly, half of the connecting line L2 is located in the region of the grid g211 of the concentration grid data G21, and the other half of the connecting line L2 is located in the region of the grid g212 of the concentration grid data G21, and thus, the processing device may use the intermediate color of the colors of the grids g211 and g212 as the color of the line segment L2', meaning regarding the average of the concentration values of the grids g211 and g212 as the concentration representative value of the line segment L2' of the fluid concentration trajectory.

As shown in sub-figure (c), the processing device obtains the connecting line L3 between the estimated position P2 (the $2^{nd}$ position) and the estimated position P3 (the $3^{rd}$ position), and obtains the grid concentration values corresponding to the grids g221 and g222 overlapping the connecting line L3 from the concentration grid data G22 corresponding to the detection time point $t_2$ (the 2nd time point) to calculate the concentration representative value corresponding to the connecting line L3. More particularly, half of the connecting line L3 is located in the grid g221 of the concentration grid data G22, and the other half of the connecting line L3 is located in the grid g222 of the concentration grid data G22, and thus, the processing device may use the intermediate color of the colors of the grids g221 and g222 as the color of the line segment L3', meaning regarding the average of the concentration values of the grids g221 and g222 as the concentration representative value of the line segment L3' of the fluid concentration trajectory. The method of obtaining the concentration representative values of the remaining line segments may be deduced according to the above, and is not repeated herein.

FIG. 8 exemplarily presents an embodiment of creating the fluid concentration trajectory in a chronological order. The initial position and the initial time point in steps S51 and S52 of this embodiment may be set by a user based on requirements, and steps S54 and S55 are performed using the concentration grid figure corresponding to the $j^{th}$ time point. In another embodiment, the processing device may create the fluid concentration trajectory in a reverse chronological order, meaning under the condition of the time interval Δt being a negative value. In this embodiment, the initial time point may be set as one of said detection time points, the $1^{st}$ time point is a detection time point earlier than the initial time point, and the 2nd time point is a detection time point earlier than the $1^{st}$ time point, and so on. The initial position in steps S51 and S52 of this embodiment may be the detection position where a pollution alarm occurs, the initial time point may be the previous detection time point before the detection time point when the pollution alarms occurs (the pollution alarm time point), meaning the detection time point that is one time interval earlier than the pollution alarm time point, and steps S54 and S55 are performed using the concentration grid figure corresponding to the $j^{th}$ time point.

The line segments obtained through the above method may compose the fluid concentration trajectory. In an embodiment, the processing device, after creating the fluid concentration trajectory as described above, may further superimpose the fluid concentration to the map image of the detected region, and label the line segments with the detection time points respectively to obtain a four-dimensional trajectory diagram. The four-dimensional trajectory diagram includes the two-dimensional geographic information, the time information and the concentration information. The processing device may further output the four-dimensional trajectory diagram through the data output device.

In addition, the processing device may further perform tracing and locating the potential source of pollution according to the fluid concentration trajectory, wherein said tracing and locating may include: perform a concentration difference calculation procedure, wherein the concentration difference calculation procedure includes calculating a difference value between a concentration representative value indicated by a $q^{th}$ line segment and a concentration representative value indicated by a $(q-1)^{th}$ line segment in the fluid concentration trajectory; determining whether the difference value is greater than a default threshold; when the difference value is smaller or equals to the default threshold, decreasing a value of q by 1, and performing the concentration difference calculation procedure again; and when the difference value is greater than the default threshold, determining the q line segment corresponding to a potential pollution source. More particularly, the difference value is obtained by subtracting the concentration representative value indicated by the $(q-1)^{th}$ line segment from the concentration representative value indicated by the $q^{th}$ line segment. The $q^{th}$ line segment used by the initial concentration difference calculation procedure may be a line segment corresponding to the detection time point of the occurrence of the pollution alarm, or may be a line segment set by a user based on requirements. Wherein, the value q is defined as a positive integer.

As described above, the processing device performs obtaining the estimated position in reverse chronological order (step S4 in FIG. 2) and creating the fluid concentration trajectory (step S5 in FIG. 2). In an embodiment, steps S4 and S5 of FIG. 2 and the tracing and locating described above may performed simultaneously, wherein the number of the estimated positions may be determined based on the result of the tracing and locating. More particularly, the processing device may backtrack the estimated positions corresponding to the previous time point and the time point before the previous time point according to the position of the sensor where the pollution alarm occurs and the time point when the pollution alarm occurs, obtain the concentration representative value indicated by the line segment between the position of the sensor where the pollution alarm occurs and the estimated position corresponding to the previous one time point as well as the concentration representative value indicated by the line segment between the estimated position corresponding to the previous time point and the estimated position corresponding to the time point before the previous time point, and determine whether the difference value between the two concentration representative values exceeds the default threshold. If the result of determination is "no", the process continues to the obtaining of the estimated position and the concentration representative value; if the result of determination is "yes", the process stops backtracking the estimated position.

Figure 9:
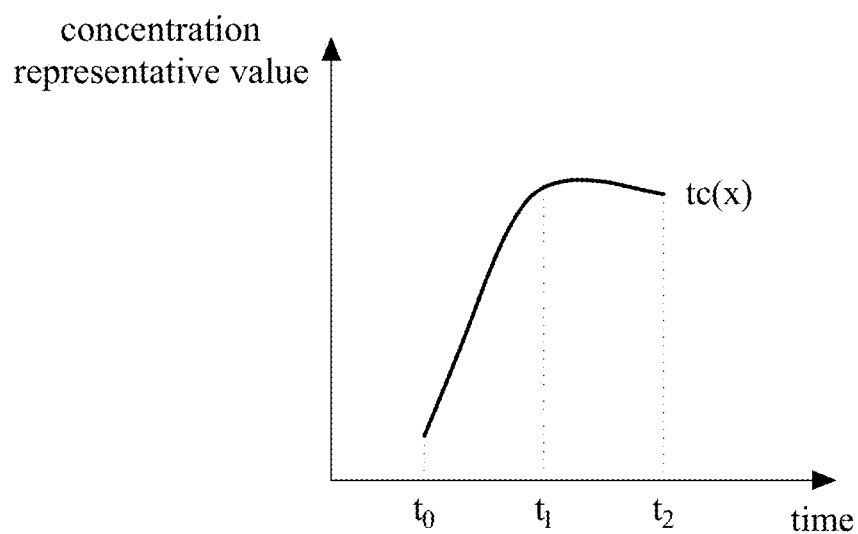
FIG. 9 is a diagram showing the relationship between the concentration representative value included in the fluid concentration trajectory and the detection time point according to an embodiment of the present disclosure.

For describing the above-mentioned method of tracing and locating with a schematic diagram. Please refer to FIG. 8 and FIG. 9, wherein FIG. 9 is a diagram showing the relationship between the concentration representative value included in the fluid concentration trajectory and the detection time point according to an embodiment of the present disclosure. The concentration representative values of the line segments L1'-L3' of FIG. 8 correspond to the detection time points $t_0$-$t_2$ respectively. The processing device may perform the concentration difference calculation procedure starting from the $3^{rd}$ line segment L3' corresponding to the detection time point $t_2$ until determining that the difference value between the concentration representative value indicated by the $2^{nd}$ line segment L2' corresponding to the detection time point $t_1$ and the concentration representative value indicated by the $1^{st}$ line segment L1' corresponding to the detection time point $t_0$ is greater than the default threshold, thereby determining that the $2^{nd}$ line segment L2' corresponds to the potential pollution source, meaning regarding the geographic position corresponding to the $2^{nd}$ line segment L2' on the map image as the potential pollution source.

Figure 10:
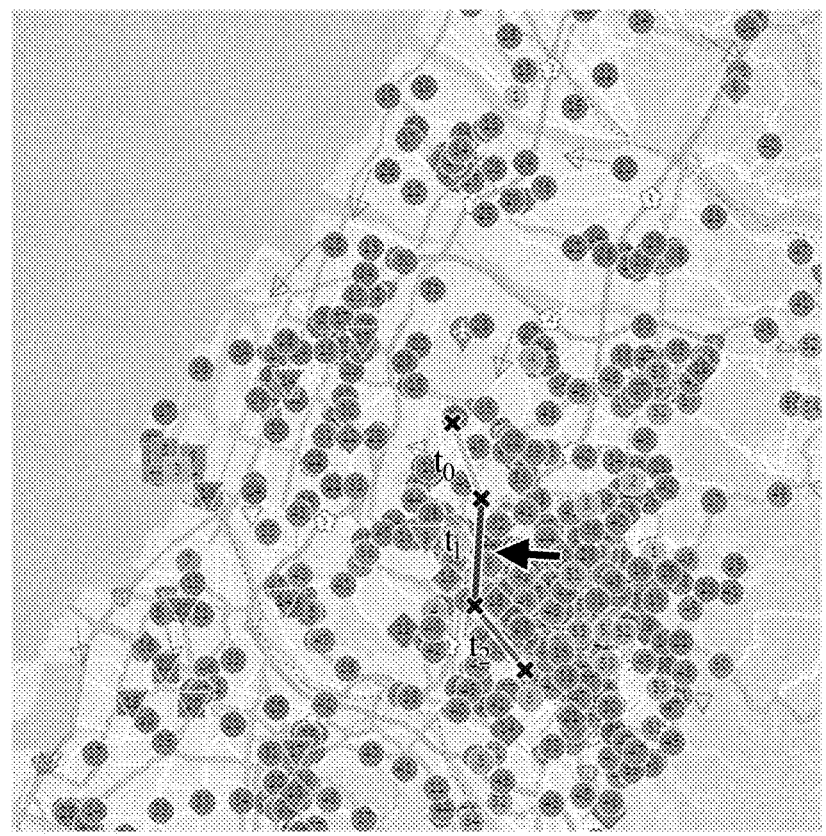
FIG. 10 is a schematic diagram of a four-dimensional trajectory diagram generated by a fluid quality tracing method according to an embodiment of the present disclosure.

As described above, the processing device may generate the four-dimensional trajectory diagram. In addition, the processing device may further mark the potential pollution source obtained through the tracing and locating described above on the four-dimensional trajectory diagram. Please refer to FIG. 10. FIG. 10 is a schematic diagram of a four-dimensional trajectory diagram generated by a fluid quality tracing method according to an embodiment of the present disclosure. As shown in FIG. 10, the four-dimensional trajectory diagram may include two-dimensional geographic information, time information (the detection time point $t_0$-$t_2$), concentration information and the potential pollution source (marked with an arrow). It is worth noting that the time information shown in FIG. 10 may be further used to indicate the concentration representative value of each line segment of the trajectory, such as the line segment marked as $t_0$, which corresponds to the concentration representative value of $t_0$ (for example, the relationship of time and concentration representative value shown in FIG. 9).

Through the above structure, the fluid quality tracing method and system of the present disclosure may use the known fluid concentration distribution data and fluid moving data to create the data having the fluid moving route and the data of concentration information over time, and provide the fluid quality status information that is easy to read and understand. Compared with the conventional air quality analysis, the fluid quality tracing method and system of the present disclosure does not need to perform calculation with a huge amount of data and complex mathematical models, and may obtain calculation result at a higher speed. In addition, the fluid concentration trajectory created by the fluid quality tracing method and system of the present disclosure may be applied to pollution source tracing.

What is claimed is:

1. A fluid quality tracing method, performed by a processing device, comprising:
   obtaining a plurality of pieces of fluid concentration distribution data of a detected region, wherein the plurality of pieces of fluid concentration distribution data correspond to a plurality of detection time points respectively;

generating a plurality of pieces of concentration grid data respectively according to the plurality of pieces of fluid concentration distribution data;

obtaining a plurality of pieces of fluid moving data of the detected region, wherein the plurality of pieces of fluid moving data correspond to the detection time points respectively;

obtaining a plurality of estimated positions according to the plurality of pieces of fluid moving data, an initial position and an initial time point corresponding to the initial position, wherein the initial position and the plurality of estimated positions are located in the detected region;

creating a fluid concentration trajectory according to the plurality of pieces of concentration grid data, the initial position, the initial time point and the plurality of estimated positions, wherein the fluid concentration trajectory comprises a plurality of line segments, a plurality of terminals of the plurality of line segments correspond to the initial position and the plurality of estimated positions respectively, and the plurality of line segments indicate a plurality of concentration representative values respectively; and a concentration difference calculation procedure, comprising:

calculating a difference value between a concentration representative value indicated by a $q^{th}$ line segment of the plurality of line segments and a concentration representative value indicated by a line segment with a number less than q of the plurality of line segments among the plurality of concentration representative values;

determining whether the difference value is greater than a default threshold;

when the difference value is smaller or equals to the default threshold, decreasing a value of q by 1, and performing the concentration difference calculation procedure again; and when the difference value is greater than the default threshold, determining that the $q^{th}$ line segment corresponds to a potential pollution source.

2. The fluid quality tracing method according to claim 1, wherein each of the plurality of pieces of fluid concentration distribution data comprises a plurality of concentration point positions and a plurality of concentration point values corresponding to the plurality of concentration point positions respectively, and by the processing device, generating the plurality of pieces of concentration grid data respectively according to the plurality of pieces of fluid concentration distribution data comprises:

performing, by the processing device, steps on each of the plurality of pieces of fluid concentration distribution data, wherein the steps comprise:

dividing the detected region into a plurality of grids; and according to a region of each of the grids and the plurality of concentration point positions in the fluid concentration distribution data, obtaining one or more concentration point values of the fluid concentration distribution data values indicated by one or more concentration point positions in each of the grids, and performing calculation on the one or more concentration point values to obtain a grid concentration value of each of the plurality of grids.

3. The fluid quality tracing method according to claim 2, wherein an area of each of the plurality of grids depends on a scale of the detected region.

4. The fluid quality tracing method according to claim 2, wherein the initial time point corresponds to one of the plurality of detection time points, a number of the plurality of estimated positions is N, and by the processing device, creating the fluid concentration trajectory according to the plurality of pieces of concentration grid data, the initial position, the initial time point and the plurality of estimated positions comprises:

obtaining a first connecting line between the initial position and a 1st position of the plurality of estimated positions;

obtaining, from the concentration grid data corresponding to the initial time point, one or more first grid concentration values corresponding to one or more first grids overlapping the first connecting line according to the first connecting line and regions of the plurality of grids, and calculating one of the plurality of concentration representative values according to the one or more first grid concentration values; and performing a loop calculation, wherein a value of j is defined as a positive integer and an initial value of j is 1, with the loop calculation comprising:

obtaining a second connecting line between a $j^{th}$ position and a $(j+1)^{th}$ position of the plurality of estimated positions;

obtaining, from the concentration grid data corresponding to a $j^{th}$ time point, one or more second grid concentration values corresponding to one or more second grids overlapping the second connecting line according to the second connecting line and regions of the plurality of grids, and calculating another one of the plurality of concentration representative values according to the one or more second grid concentration values; and increasing the value of j by 1; and performing the loop calculation again when the value of j is smaller than N.

5. The fluid quality tracing method according to claim 4, wherein the one or more first grids corresponding to the first connecting line is a plurality of first grids, the one or more first grid concentration values is a plurality of first grid concentration values, and by the processing device, obtaining the one or more first grid concentration values corresponding to the one or more first grids overlapping the first connecting line according to the range of the first connecting line and the grids, and calculating one of the plurality of concentration representative values according to the plurality of first grid concentration values comprises:

obtaining a plurality of lengths of the first connecting line overlapping the plurality of first grids respectively; and using a plurality of ratios of the plurality of lengths as weights of the plurality of first grid concentration values to perform a weighted sum operation, and using a result of the weighted sum operation as one of the plurality of concentration representative values.

6. The fluid quality tracing method according to claim 1, wherein the initial time point corresponds to one of the plurality of detection time points, a number of the plurality of estimated positions is N, any two adjacent detection time points of the plurality of detection time points have a time interval therebetween, and by the processing device, obtaining the plurality of estimated positions according to the plurality of pieces of fluid moving data, the initial position and the initial time point corresponding to the initial position comprises:

performing calculation by using fluid moving data corresponding to the initial time point among the plurality of pieces of fluid moving data and the time interval to obtain a displacement, and using the initial position and the displacement to obtain a 1st position as one of the plurality of estimated positions; and performing a loop calculation, wherein a value of i is defined as a positive integer and an initial value of i is 1, with the loop calculation comprising:
  performing calculation by using the fluid moving data corresponding to a $i^{th}$ time point of the detection time points among the plurality of pieces of fluid moving data and the time interval to obtain another displacement, and using a $i^{th}$ position and the another displacement to obtain a $(i+1)^{th}$ position as another one of the plurality of estimated positions;
  increasing the value of i by 1; and
  performing the loop calculation again when the value of i is smaller than N.

7. The fluid quality tracing method according to claim 6, wherein the plurality of detection time points comprise a pollution alarm time point, the pollution alarm time point is used as the initial time point, and the plurality of estimated positions are obtained in reverse chronological order.

8. The fluid quality tracing method according to claim 6, wherein each of the plurality of pieces of fluid moving data comprises a plurality of pieces of source sub-data, and by the processing device, performing calculation to obtain the displacement comprises:
  determining a plurality of weights corresponding to the plurality of pieces of source sub-data respectively according to a scale of the detected region;
  using the plurality of pieces of source sub-data to obtain a plurality of displacement components;
  performing a weighted sum operation on the plurality of displacement components by using the plurality of weights; and
  multiplying a result of the weighted sum operation by the time interval to obtain a product as the displacement.

9. The fluid quality tracing method according to claim 1, further comprising by the processing device, performing:
  superimposing the fluid concentration trajectory to a map image of the detected region, and labeling the plurality of detection time points on the plurality of line segments respectively.

10. A fluid quality tracing system, comprising:
  a data input device configured to obtain a plurality of pieces of fluid concentration distribution data and a plurality of pieces of fluid moving data of a detected region wherein the plurality of pieces of fluid concentration distribution data correspond to a plurality of detection time points respectively, and the plurality of pieces of fluid moving data corresponds to the detection time points respectively;
  a processing device connected to the data input device, and configured to perform:
    generating a plurality of pieces of concentration grid data respectively according to the plurality of pieces of fluid concentration distribution data;
    obtaining a plurality of estimated positions according to the plurality of pieces of fluid moving data, an initial position and an initial time point corresponding to the initial position, wherein the initial position and the plurality of estimated positions are located in the detected region; and
    creating a fluid concentration trajectory according to the plurality of pieces of concentration grid data, the initial position, the initial time point and the plurality of estimated positions, wherein the fluid concentration trajectory comprises a plurality of line segments, a plurality of terminals of the plurality of line segments correspond to the initial position and the plurality of estimated positions respectively, and the plurality of line segments indicate a plurality of concentration representative values respectively; and
  a storage device connected to the processing device, and configured to store the fluid concentration trajectory,
  wherein the processing device is further configured to perform:
    a concentration difference calculation procedure, comprising:
      calculating a difference value between a concentration representative value indicated by a $q^{th}$ line segment of the plurality of line segments and a concentration representative value indicated by a line segment with a number less than q of the plurality of line segments among the plurality of concentration representative values;
      determining whether the difference value is greater than a default threshold;
      when the difference value is smaller or equals to the default threshold, decreasing a value of q by 1, and performing the concentration difference calculation procedure again; and
      when the difference value is greater than the default threshold, determining that the $q^{th}$ line segment corresponds to a potential pollution source.

11. The fluid quality tracing system according to claim 10, wherein each of the plurality of pieces of fluid concentration distribution data comprises a plurality of concentration point positions and a plurality of concentration point values corresponding to the plurality of concentration point positions respectively, and generating the plurality of pieces of concentration grid data performed by the processing device comprises:
  performing steps on each of the plurality of pieces of fluid concentration distribution data, wherein the steps comprise:
    dividing the detected region into a plurality of grids; and
    according to a region of each of the grids and the concentration point positions in the fluid concentration distribution data, obtaining one or more concentration point values of the fluid concentration distribution data values indicated by one or more concentration point positions in each of the grids, and performing calculation on the one or more concentration point values to obtain a grid concentration value of the fluid concentration distribution data of each of the plurality of grids.

12. The fluid quality tracing system according to claim 11, wherein an area of each of the plurality of grids depends on a scale of the detected region.

13. The fluid quality tracing system according to claim 11, wherein the initial time point corresponds to one of the plurality of detection time points, a number of the plurality of estimated positions is N, and creating the fluid concentration trajectory performed by the processing device comprises:
  obtaining a first connecting line between the initial position and a 1st position of the plurality of estimated positions;
  obtaining, from the concentration grid data corresponding to the initial time point, one or more first grid concentration values corresponding to one or more first grids overlapping the first connecting line according to the first connecting line and regions of the plurality of grids, and calculating one of the plurality of concentration representative values according to the one or more first grid concentration values; and performing a loop calculation, wherein a value of j is defined as a positive integer and an initial value of j is 1, with the loop calculation comprising:

obtaining a second connecting line between a $j^{th}$ position and a $(j+1)^{th}$ position of the plurality of estimated positions;

obtaining, from the concentration grid data corresponding to a $j^{th}$ time point, one or more second grid concentration values corresponding to one or more second grids overlapping the second connecting line according to the second connecting line and regions of the plurality of grids, and calculating another one of the plurality of concentration representative values according to the one or more second grid concentration values; and adding the value of j by 1; and performing the loop calculation again when the value of j is smaller than N.

14. The fluid quality tracing system according to claim 13, wherein the one or more first grids corresponding to the first connecting line is a plurality of first grids, the one or more first grid concentration values is a plurality of first grid concentration values, and obtaining one of the plurality of concentration representative values performed by the processing device comprises:

obtaining a plurality of lengths of the first connecting line overlapping the plurality of first grids respectively; and using a plurality of ratios of the plurality of lengths as weights of the plurality of first grid concentration values to perform a weighted sum operation, and using a result of the weighted sum operation as one of the plurality of concentration representative values.

15. The fluid quality tracing system according to claim 11, wherein the initial time point corresponds to one of the plurality of detection time points, a number of the plurality of estimated positions is N, any two adjacent detection time points of the plurality of detection time points have a time interval therebetween, and obtaining the plurality of estimated positions performed by the processing device comprises:

performing calculation by using fluid moving data corresponding to the initial time point among the plurality of pieces of fluid moving data and the time interval to obtain a displacement, and using the initial position and the displacement to obtain a 1st position as one of the plurality of estimated positions; and performing a loop calculation, wherein a value of i is defined as a positive integer and an initial value of i is 1, with the loop calculation comprising:

performing calculation on by using the fluid moving data corresponding to a $i^{th}$ time point of the detection time points among the plurality of pieces of fluid moving data and the time interval to obtain another displacement, and using a $i^{th}$ position and the another displacement to obtain a $(i+1)^{th}$ position as another one of the plurality of estimated positions;

increasing the value of i by 1; and performing the loop calculation again when the value of i is smaller than N.

16. The fluid quality tracing system according to claim 15, wherein the plurality of detection time points comprise a pollution alarm time point, the pollution alarm time point is used as the initial time point, and the plurality of estimated positions are obtained in reverse chronological order.

17. The fluid quality tracing system according to claim 15, wherein each of the plurality of pieces of fluid moving data comprises a plurality of pieces of source sub-data, and performing calculation to obtain the displacement performed by the processing device comprises:

determining a plurality of weights corresponding to the plurality of pieces of source sub-data respectively according to a scale of the detected region;

using the plurality of pieces of source sub-data to obtain a plurality of displacement components;

performing a weighted sum operation on the plurality of displacement components by using the plurality of weights; and multiplying a result of the weighted sum operation by the time interval to obtain a product as the displacement.

18. The fluid quality tracing system according to claim 10, wherein the processing device is further configured to perform:

superimposing the fluid concentration trajectory to a map image of the detected region, and labeling the plurality of detection time points on the plurality of line segments respectively.

* * * * *